United States Patent [19]
Ide

[11] Patent Number: 5,215,385
[45] Date of Patent: Jun. 1, 1993

[54] LOW-PROFILE DISK DRIVE MOTOR WITH DEFLECTING-PAD BEARINGS

[76] Inventor: Russell D. Ide, P.O. Box 744, 641 Arnold Rd., Coventry, R.I. 02816

[21] Appl. No.: 883,487

[22] Filed: May 15, 1992

Related U.S. Application Data

[62] Division of Ser. No. 670,264, Mar. 14, 1991, Pat. No. 5,142,174, which is a division of Ser. No. 494,415, Mar. 16, 1990, Pat. No. 5,013,947.

[51] Int. Cl.$^5$ ............................................. F16C 32/06
[52] U.S. Cl. ................................. 384/100; 384/106; 384/119
[58] Field of Search ............... 384/100, 103, 106, 119, 384/124, 192, 215, 279, 309, 312

[56] References Cited

U.S. PATENT DOCUMENTS

| | | | |
|---|---|---|---|
| 2,153,397 | 4/1939 | Sandler | 384/279 |
| 4,453,838 | 6/1984 | Loizeau | 384/215 X |
| 4,767,222 | 8/1988 | Paletta et al. | 384/106 |
| 4,886,378 | 12/1989 | Matake | 384/124 X |
| 5,017,022 | 5/1991 | Ruggles et al. | 384/100 |

*Primary Examiner*—Thomas R. Hannon
*Attorney, Agent, or Firm*—Marks & Murase

[57] ABSTRACT

A disk drive motor having a low profile construction and a gas-lubricated deflecting pad support usable in the disk drive motor and elsewhere.

The motor includes a cup-shaped rotor having an integral cylindrical portion extending from the base of the cup; the cylindrical extension may be a shaft or a large hollow extension which encloses the stator windings. The stator can be conventional or can have a closed end and/or a cup-like portion to simplify construction and eliminate the need for a seal. A support mounted on the stator or the rotor supports the rotor for rotation relative to the stator. The support can be a deflecting pad support such as a deflecting pad hydrodynamic bearing or the plane or gas-lubricated deflecting pad support disclosed herein.

The gas-lubricated deflecting pad support member includes bearing pads and a support structure which supports the bearings for strictly radial movement. A contoured surface is formed on the pad surfaces or a support surface opposing the pad surfaces or both. Relative rotation between the pad surfaces and the support surface results in the development of a pressurized gas film between the support surface and the pad surface.

21 Claims, 8 Drawing Sheets

LOW-PROFILE DISK DRIVE MOTOR WITH DEFLECTING-PAD BEARINGS

This application is a division of application Ser. No. 07/670,264 filed Mar. 14, 1991 U.S. Pat. No. 5,142,174.

Which application is a division of U.S. application Ser. No. 7/494,415 filed Mar. 16, 1990 and now U.S. Pat. No. 5,013,947.

FIELD OF THE INVENTION

This invention relates to interlocked disk drive configurations and deflecting pad support members usable in disk drives and elsewhere.

BACKGROUND OF THE INVENTION

This invention relates, in part, to a motor for rotating a magnetic disk. In particular, it relates to a motor which is used for an application in which magnetic disks, each formed with a magnetic layer on a metal disk are driven by the motor, and data is recorded on and reproduced from the magnetic disk by magnetic heads disposed near the upper and lower surfaces of each magnetic disk. Such motors are commonly referred to as disk drive motors.

The increasing use of rotating magnetic disks as a computer memory medium has created a demand for small, high speed drives which accurately rotate and position magnetic disks memories. External rotor type motors having a permanent magnetic rotor which surrounds a stator, such as a multiple pole stator, have been used in such drives. One such construction is shown in U.S. Pat. No. 4,599,664 to Schok. The stator typically has a one-phase winding which produces an alternating field and an auxiliary reluctance moment which, in cooperation with the electromagnetic torque, produces a total torque of high constancy. The rotor shaft is mounted within the stator by a ball bearing structure, with the rotor secured to the outer end of the motor shaft and defining a cantilevered bearing support. The disk drive is secured to the opposite end of the motor shaft.

Disk drives require structures for supporting the cantilevered mounted rotor which provide accurate and long-life support. Various sleeve and rolling element (e.g., ball) bearing structures have been suggested for use in permanent magnet motors for disk drives.

In one ball-bearing unit, described in the background of U.S. Pat. No. 4,672,250 to Seitz, a pair of axially spaced high precision rotary ball-bearings are secured within a machined hub of the stator structure. The outer race of each bearing is fitted within the hub. The outer race of a first bearing is bonded within the hub. The second bearing is held in the hub during assembly by a special 0-ring member located within an annular recess in the hub. The inner races of the bearings are fitted onto the motor shaft and generally into abutting relation with a locating shoulder on the shaft and an outer hub member on the outer end of the shaft. A steel snap-ring or an integral spacer is interposed within a machined recess in the hub between the two bearings. Suitable flat spring washers are interposed between the snap-ring and the respective opposed outer bearings of the two space-bearings to resiliently load the bearings and hold them in position with the desired accuracy and support.

The Seitz patent also discloses a cup-shaped rotor which overlies the stator and has a rotor shaft journalled in the hub by spaced sealed precision bearings.

Although rolling element bearings such as ball bearings have been and are presently widely used in commercially available motors, their use presents a number of problems. For example, ball bearings are subject to relatively fast wear and rapid damage, especially if the environment in which they are located becomes contaminated. This is, of course, true for any support structure which relies on rolling or other solid contact between the rotating and stationary members. Additionally, ball bearings are bulky and increase both the radial and verticle dimension of the disk drive significantly. For these reasons, ball bearings adversely affect both the cost and reliability of disk drives. Thus, there remains a need to improve the operating characteristics of the rotor support structure to minimize the cost.

Of course, there are many known alternatives to rolling element (ball, roller and needle) bearings. Among these are pivoting element bearings and hydrodynamic bearings. Also, the present inventor has developed a deflecting pad hydrodynamic bearing which includes a plurality of bearing pads and a support structure which supports the bearing pads for deflection in a manner which optimizes hydrodynamic wedge formation. Despite recent advances in these alternative bearing technologies, most notably the present inventor's developments in the field of hydrodynamic bearings, these technologies have not been widely used in disk drives. To some extent this may be the result of a failure to recognize the applicability of other forms of bearings to disk drives or the recent nature of improvements in bearing technology.

Another known bearing is the so-called gas-lubricated bearing. Such bearings are made by forming (typically by etching) a contoured surface onto the surface of one or both of the rotating shaft and the stationary shaft support. For manufacturing convenience, the contour is usually formed on only one of the surfaces and one of the two opposed surfaces is left smooth. A precise clearance between the support surface and the shaft, at least one of which has a contoured surface is maintained, such that, as the shaft begins to rotate, gas flowing across the contoured surface becomes turbulent and is pressurized to the extent necessary to support the shaft. If the tolerances are carefully maintained so that the bearing operates as designed, the shaft and bearing do not make contact; instead, the shaft is supported on a cushion of pressurized air. Such gas-lubricated bearing constructions can be applied to both radial bearings and thrust bearings. Further, various contoured shapes may be used including taper, taper-flat, step, pocket, spiral groove and herringbone contours. At least for thrust bearings, it is believed that a spiral groove contour is probably the best.

One of the major drawbacks of conventional gas-lubricated bearings, particularly with respect to radial bearings, is the small manufacturing tolerances required to maintain tight clearances. Since gas-lubricated bearings are typically used in small light load applications and the depth of the contour can be in the range of 1/10,000 of an inch, such spacing between the shaft and support member must be very small. In practice, it has proven difficult to economically manufacture to these close tolerances. Thus, despite the advantages they offer, gas-lubricated bearings have also not yet found wide acceptance as a substitute for rolling element and other types of bearings.

A similar drawback occurs with another known bearing commonly referred to as a plane or oilite bearing.

This bearing is simply a smooth sleeve formed of a porous metal such as, for example, bronze. The porous metal is loaded with an oil or graphite lubricant. The support surface of the element moving with respect to the plane bearing simply slides on the oil or graphite lubricated surface of the plane bearing. However, in order to achieve uniform wear and to obtain accurate shaft positioning, the bearing must be manufactured to extremely close tolerances. Consequently, this type of bearing is not widely used in disk drives.

As suggested above, alternative bearing constructions have not yet been incorporated into disk drives in a commercially successful way. Thus, despite the recognized drawbacks of rolling element bearings, they are still prevalent in the disk drive industry.

Another trend within the disk drive field has been toward low-profile disk drives; this is particularly true in the lap-top computer field. Numerous attempts have been made to decrease the profile (verticle height) of disk drives without affecting performance. One example of such an attempt is that disclosed in U.S. Pat. No. 4,658,312 issued to Elsasser, et al. Constructions such as this typically employ ball-bearings and a separate shaft and rotor; these features limit the extent to which vertical height can be decreased because, for example, the top of the rotor housing must be thick enough to allow connection with the separate shaft.

Thus, there remains a need for a low-profile disk drive which is reliable, inexpensive and light weight. There is also a need for means, other than ball-bearings for supporting the shaft of a low-profile disk drive construction. Finally, there is a need for a gas-lubricated bearing which can be economically manufactured, i.e., does not have to be manufactured to close tolerances.

SUMMARY OF THE INVENTION

The present invention provides a low-profile disk drive motor which overcomes the disadvantages of known low-profile disk drive motors by, for example, providing a modified rotor and/or stator casing design. The present invention also provides a disk drive motor which includes a deflecting pad support member mounted to either the rotor or the stator for supporting the rotor for rotation with respect to the stator. The deflecting pad support member may be a support member having bearings supported by a support structure so as to form a hydrodynamic wedge or a new self-adjusting plane or gas-lubricated deflecting pad support member described herein. Further, the present invention provides a novel new deflecting pad support member which obviates the disadvantages associated with rolling element bearing supports; this new deflecting pad support member has many applications and can be used in the disk drive motor of the present invention.

The motor for driving a magnetic disk includes a rotor casing, having at least one permanent magnet mounted thereon and including at least one axially extending cylindrical surface portion, a stator, including laminations and windings and at least one cylindrical surface which is coaxial with the cylindrical surface of the rotor and spaced therefrom by a predetermined amount and at least one support member for supporting the rotor for rotation with respect to the stator. The support member is mounted to one of the rotor and the stator for rotation relative to other member, the other member has a support surface. If the support member is a deflecting pad support member it can include a plurality of substantially rigid pads and a support structure for supporting the pads. The support structure is designed to cause the pads to deflect as desired under load. In the case of a hydrodynamic bearing, this means deflection to optimize wedge formation. For a plane or gas-lubricated bearing, this means radial deflection.

The deflecting pad support member is mounted to one of the stationary member and the rotating member for rotation relative to the other member. The other member has a support surface. The deflecting pad support member includes a plurality of substantially rigid pads and a support structure for supporting the pads. Each pad has a pad surface adapted to contact the support surface of the member which rotates relative to it. The support structure includes a substantially rigid primary support portion supporting the pads, a second membrane-like support portion supporting the primary support portion and a substantially rigid tertiary support portion supporting the secondary support portion for movement in the radial direction. The second support portion is flexible only in the radial direction. The support structure is arranged so as to substantially inhibit movement of the pads other than directly toward or away from the surface it contacts. If the support member is to be gas-lubricated, a contour is formed on at least one of the pad surfaces and the support surface. The contour is shaped such that, upon rotation of the rotating member, air located between the pads and the surface is pressurized such that the pads deflect away from the support surface and are separated by a film of pressurized fluid. If the support member is plain, then at least the pads are formed of a porous material preferably metal such as bronze and a lubricant such as oil or graphite is loaded into the porous metal.

In one embodiment, the interlocked disk drive motor includes a rotor casing having a cup-shaped portion with cylindrical walls and a closed end, and a shaft extending from the closed end coaxial with the cylindrical walls, a stator having at least a portion mounted in the cylindrical space between the walls and the shaft, and a deflecting pad support member for supporting the rotor for rotation with respect to the stator.

In a modified version of this embodiment, the stator may be cup-shaped as well as adapted to fit within the rotor (with open ends of the respective cup members facing opposite directions) so as to, among other things, eliminate the need for one set of seals and allow further reduction of disk drive profile.

The deflecting pad support member which supports the rotor for rotation with respect to the stator may be a deflection pad bearing, or a plain bearing or gas-lubricated bearing which is spring loaded by mounting on a radially deflecting pad or a combined gas-lubricated and hydrodynamic bearing in which a gas-lubricating type contour is provided on the pad surface of a hydrodynamic bearing or the support surface which the pad moves relative to. Normally, the support member is located between the stator and the shaft which extends from the rotor. When a deflecting pad support member is used (whether a hydrodynamic bearing, a plain bearing or a gas-lubricated bearing) it may be mounted either to the stator or rotor. If mounted on the rotor, centrifugal forces will close the initial gap, but the end result will be a relaxation of manufacturing tolerances.

In another embodiment of the present invention, the interlocked low-profile disk drive may have a construction in which both the stator and the rotor have a cup-shaped configuration and the rotor includes in addition to the cylindrical walls forming its outer periphery an inner cylindrical wall; the stators cylindrical outer peripheral wall extends into the space between the inner and outer peripheral walls of the rotor. In this embodiment, the deflecting pad support member or bearings are mounted between the spaced coaxial cylindrical walls of the cup-shaped members, i.e., between the cylindrical peripheral wall of the stator and one of the walls of the rotor. The type of bearing employed in this construction can be either a rolling element bearing, a deflection pad bearing or a gas-lubricated or plane bearing mounted on a spring or deflecting pad. This construction makes it possible to support the motor stator in a cantilever fashion and eliminate the shaft support if desired. This construction offers a further advantage since it is only necessary to seal one end of the assembly.

The present invention also relates to a self-adjusting plane or gas-lubricated bearing construction which is generally useful as a replacement for a rolling element or other bearing and is particularly well suited for supporting the rotor of the present invention with respect to the stator. The bearing includes a pad supported by a support structure in a spring-like fashion for movement radially inward and outward toward the member to be supported.

The support structure includes a rigid primary support portion, a flexible membrane as a secondary support portion and spaced tertiary support portion arranged such that the secondary support member flexes in a trampoline-like fashion to allow movement of the pad radially inward and outward but to inhibit deflection in any other direction. The support member can be dimensioned such that, in the static state, the surfaces of the pads are in flush contact with the surface of the rotating member to be supported. For instance, if the support member is to be mounted on the stator to support shaft, the inner diameter of the support member is designed to be slightly smaller than the outer diameter of the shaft to be supported so that when the shaft is inserted into the support member, the pads are caused to deflect outwardly and are subsequently pressing on the shaft. Since the pad is mounted for deflection radially inward and outward toward the shaft and because it is initially fit with zero clearance over the shaft so as to pre-bias the pads toward the shaft, the pads will always have a tendency to move toward the shaft. When the support member is secured to the rotor for rotation with respect to the stator, it may be desirable to dimension the support members outer periphery to have a slight clearance with respect to the stator support surface. If this is done, the support structure can be designed so that the pads move outward as a result of centrifugal force to close the gap to the extent necessary to establish an appropriate fluid film thickness. Thus, the support structure can be designed to function as a radially oriented spring biasing the pads inward or outward.

In the case of a gas-lubricated support member, one or both of the pad surface and the surface to be supported are provided with a contoured shape such that as the rotor begins to rotate, gas (such as air) passes across the contoured surface and becomes progressively pressurized until it reaches a point where the gas pressure exceeds the characteristic stiffness of the support structure; in this case, the point where the gas pressure becomes sufficient to deflect the membrane of the secondary support portion. At this point, the pad begins to deflect radially outward away from the surface to be supported precisely such that a pressurized gas film develops between the pad and the surface to be supported. Eventually an equilibrium state is reached and the shaft is supported on a pressurized gas film and has no contact with the support surface. When the pads are moved toward the support surface by centrifugal force, the gas pressure balances the tendency of the pads to move radially outward. In practice, the fluid film is established almost instantaneously.

In the case of a plain bearing, the pad surface and support surface are smooth and at least one of them is formed of a porous material, usually metal, loaded with a lubricant such as oil or graphite.

Various shaped contours may be used including taper, taper-flat, step, pocket, spiral groove and herringbone contours. For purposes of a radial bearing, a herringbone contour construction is relatively simple to form and provides good results. Accordingly, it is the recommended construction for a radial bearing. On the other hand, for a thrust bearing, a spiral groove contour construction is probably the best.

The plain and gas-lubricated bearing constructions of the present invention obviate problems experienced with previously known plain and gas-lubricated bearings in that there is no need to manufacture the support member to the close tolerances required by known constructions. Instead, the distance between the pad and the shaft to be supported is automatically adjusted; in the case of a gas-lubricated bearing, this is done by the interaction of the gas pressure and the spring-like support structure for each bearing pad.

The present invention also relates to a hydrodynamic gas lubricated bearing which has a construction and operation similar to the above described gas-lubricated bearing, but includes a support structure which causes the bearing pad to form a hydrodynamic wedge with respect to the support surface. Various support structures can be used to achieve such deflection, including those described herein.

In accordance with another aspect of the present invention, the deflecting pad support structure may be modified so as to allow it to be mounted to the moving member or rotor in a fashion which allows the pads to run against the stator. The present invention also relates to the running pad support structure which enables such a construction.

When deflecting pad support members (either the wedge type or contoured surface type) are used in the disk drive of the present invention, it is preferable to use bearings formed of non-magnetic materials, for example, nonmetallic materials, so that the magnetic forces acting within the motor do not affect bearing performance.

The hydrodynamic, plain or gas-lubricated support member of the present invention may be formed using any conventional process. For instance, the pads and support structure can be formed by molding, extrusion, laser cutting, water jet cutting or electric discharge machining. Further, one particularly advantageous way of forming the contour onto either the rotating member or the support member is the so-called photocutting process whereby a photoresist film is placed on the shaft and a special ray is used to corrode the shaft metal.

The gas-lubricated bearings of the present invention use the air film created by the contour formed on the surface of the shaft or the pad to generate a high viscosity friction of air sucked in the grooves by high speed rotation of the shaft. The shaft floats on the air film so created.

The construction provides a simple yet reliable low-profile disk construction. The provision of deflecting supports between the stator and the rotor, rather than ball bearings, provides improved support at a fraction of the cost of ball bearings. Additionally, those deflecting supports which cause the shaft to be supported on a fluid film have a far greater expected life than ball bearings. In particular, preliminary tests indicate that the support members of the present invention will last many times longer than ball bearings.

Moreover, the interlocked construction of the present invention can be assembled far easier than conventional constructions because of the fewer parts used and because the casing configuration permits a greater degree of modular assembly.

BRIEF DESCRIPTION OF THE DRAWINGS

FIG. 3B is an axial view of the shaft support of FIG. 3a.

FIG. 4B is a cross section of a different portion of the shaft support of FIG. 4a.

FIG. 7B is a partial cross section of the running shaft support of FIG. 7a.

DETAILED DESCRIPTION

Figure 1:
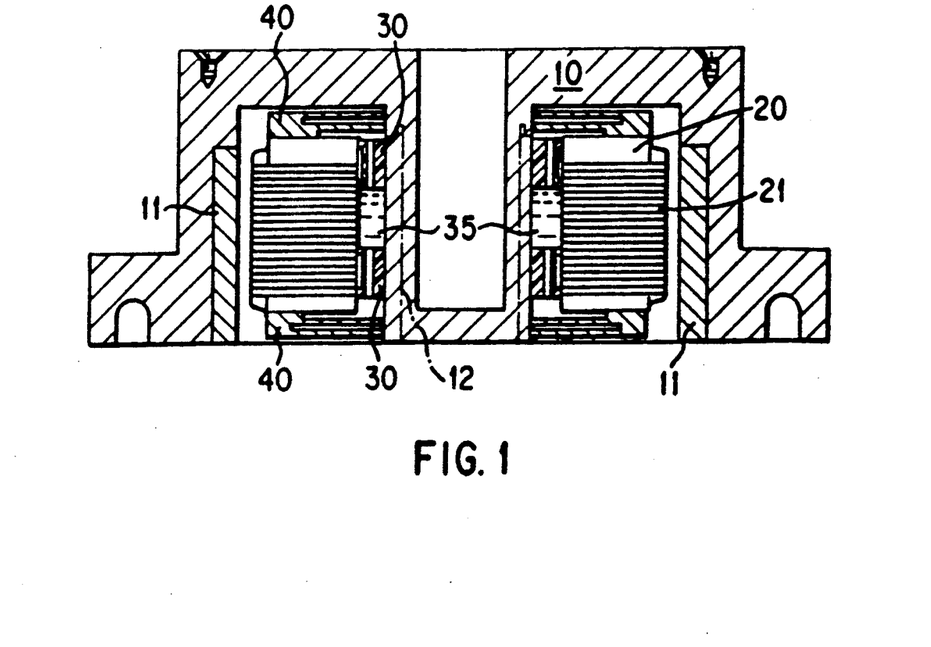
FIG. 1 is a somewhat schematic cross section of a disk drive construction according to the present invention.

FIG. 1 shows a first disk drive motor according to the present invention. The disk drive motor includes a rotor 10, a stator 20 having a motor coil, a pair of stationary shaft supports 30, an oil cavity 35 between the shaft supports 30, and a pair of seal means such as ferrofluidic seals 40 sealing the oil cavity 35. The rotor may be formed of either metallic or nonmetalic materials generally aluminum is suitable.

The electromagnetic components of the rotor 10 and stator 20 are conventional. In particular, the outer housing is provided with a plurality of permanent magnetic segments or a one part magnetic segment 11 as is known in the art. The stator 20 includes a stator lamination 22 and a stator winding 21 as is known in the art. When current is provided to the stator winding, the electromagnetic field of the winding cooperates with the magnetic field of the permanent magnet(s) to generate an electromagnetic torque by which the rotor is driven.

The present invention is specifically directed to the structural arrangement of the stator and rotor and support of the rotor for rotation relative to the stator.

FIG. 1 shows a first embodiment in which the rotor 10 has a cup-shaped outer housing and a central shaft portion. The stationary shaft supports 30, which are described in detail below, support the central shaft portion of the rotor 10 for rotation.

The provision of a central shaft portion integrally with the rotor 10 reduces the number of parts and simplifies construction of the disk drive by eliminating the need to connect a separate shaft to the rotor or in the case of many disk drives, provide bearings between the rotor and a stationary shaft. Further, the profile (vertical height) of the disk drive can be reduced because the top portion of the rotor 10 does not have to be as thick as in prior art constructions in which the shaft is press fit or threaded into the top of the rotor. Additionally, the weight of the assembly can be reduced since, because of the integral connection of the shaft to the rotor, the inner portion of the shaft can be hollowed out (as shown in phantom in FIG. 1), if desired, so as to reduce its weight.

If a particular finish or contour is to be formed on the shaft portion, it may be desirable to use the integral shaft portion as a mounting post for a separate sleeve which has the desired finish or contour. For example, if the shaft is to have a contour formed thereon for use with a gas-lubricated bearing (discussed below) a separate sleeve 12 (shown in phantom) having the desired contour etched on its surface could be mounted on the shaft portion of the rotor 10. Of course, the shaft portion would have to have a reduced radial dimension to accommodate the radial thickness of the sleeve. Such a construction would normally be preferred to forming a contour directly on the shaft portion of the rotor in those cases where a contour or other finish must be provided. Even though this construction requires an additional part, the sleeve, it still offers a number of advantages over conventional constructions because of the integral connection of the shaft portion on which the sleeve is mounted with the rest of the rotor. Specifically, a lower profile can still be obtained and the shaft portion can still be hollowed out.

Figure 2:
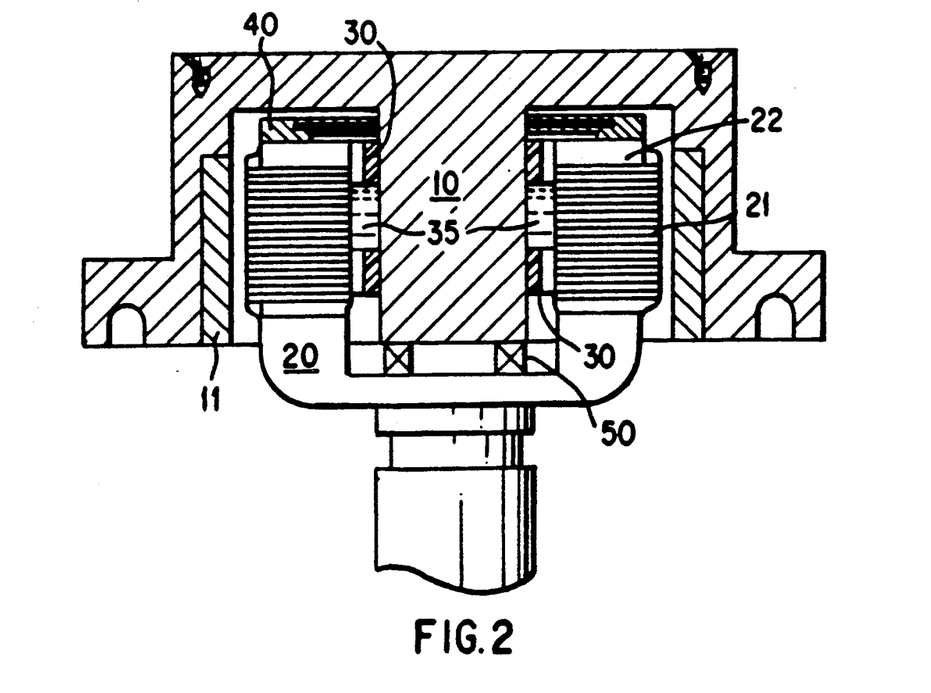
FIG. 2 is a cross section of another embodiment of the present invention.

FIG. 2 shows another disk drive motor according to the present invention. This disk drive motor has an interlocked construction generally similar to that shown in FIG. 1 except that the stator 20 is cup-shaped rather than ring-shaped. In other words, the stator includes an integral bottom base or capped portion. This construction further simplifies assembly of the motor by reducing the number of parts and making smaller parts integral with large parts to enable modular like construction. Provision of an integral cup-like stator also eliminates the need for a ferrofluidic or other seal 40 at one end of the assembly. This is because, by virtue of the integral or capped construction, the stator is fluid tight at the closed end. Further, the closed end of the stator can be used as a surface for supporting thrust bearings 50. Any known thrust bearing can be used;

however, it is believed that good results can be obtained by using hydrodynamic thrust bearings particularly deflection pad thrust bearings of the type developed by the present inventor.

As noted above with respect to FIGS. 1 and 2, each of the disk drive motor constructions described heretofore include deflecting pad stationary shaft supports 30. In accordance with an important aspect of the present invention, these shaft supports eliminate the need for ball-bearings to support the central shaft portion. Deflecting pad supports offer numerous other advantages including longer life, less noise, less friction, better shaft positioning and alignment, lower cost, better stability and damping, and a smaller radial envelope. The shaft supports could be hydrodynamic bearings such as the deflection pad bearings developed by the present inventor. These bearings include a plurality of bearing pads which are supported by a support structure for deflection under load to define a wedge between the shaft and the bearing pad surface. Depending on the orientation of the bearing pads with respect to the support structure, the bearings are mounted on either the rotor or the stator. For instance, if the bearing is mounted on the shaft portion of the rotor 10 in FIG. 1, the bearing pads must be located radially outward of the support structure; conversely, if the bearings are mounted on the stator, the bearing pads are radially inward of the support structure.

In accordance with one aspect of the present invention, hydrodynamic bearings of the type developed by the present inventor can be modified to have a gas-lubricating effect as described below. This basically involves forming a contour (discussed below) on the hydrodynamic bearing pad surface or the support surface which moves relative to the pad.

The present invention also relates to a different type of deflection pad shaft support which can be used instead of the hydrodynamic deflection pad bearing. This shaft support is a self adjusting plain or gas-lubricated shaft support and is described below with reference to FIGS. 3A, 3B, 4A, 4B, 4C, 10A, 10B and 10C. Unlike hydrodynamic bearings, these shaft supports are designed to deflect directly radially toward and away from the rotating shaft so as to accommodate movement of the shaft without forming a wedge between the support pad and the surface adjacent the pad. Thus, the support structure functions as a series of springs, each spring supporting a pad for radial movement.

Figure 3A:
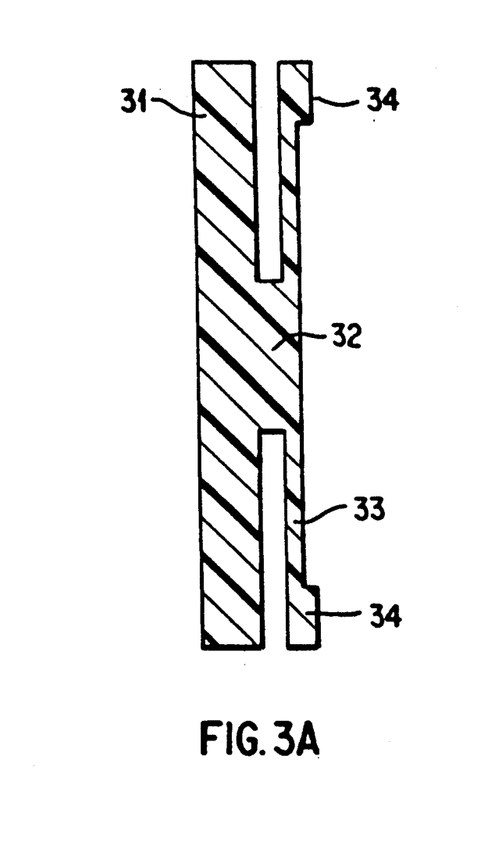
FIG. 3A is a cross section of a shaft support according to the present invention.
Figure 3B:
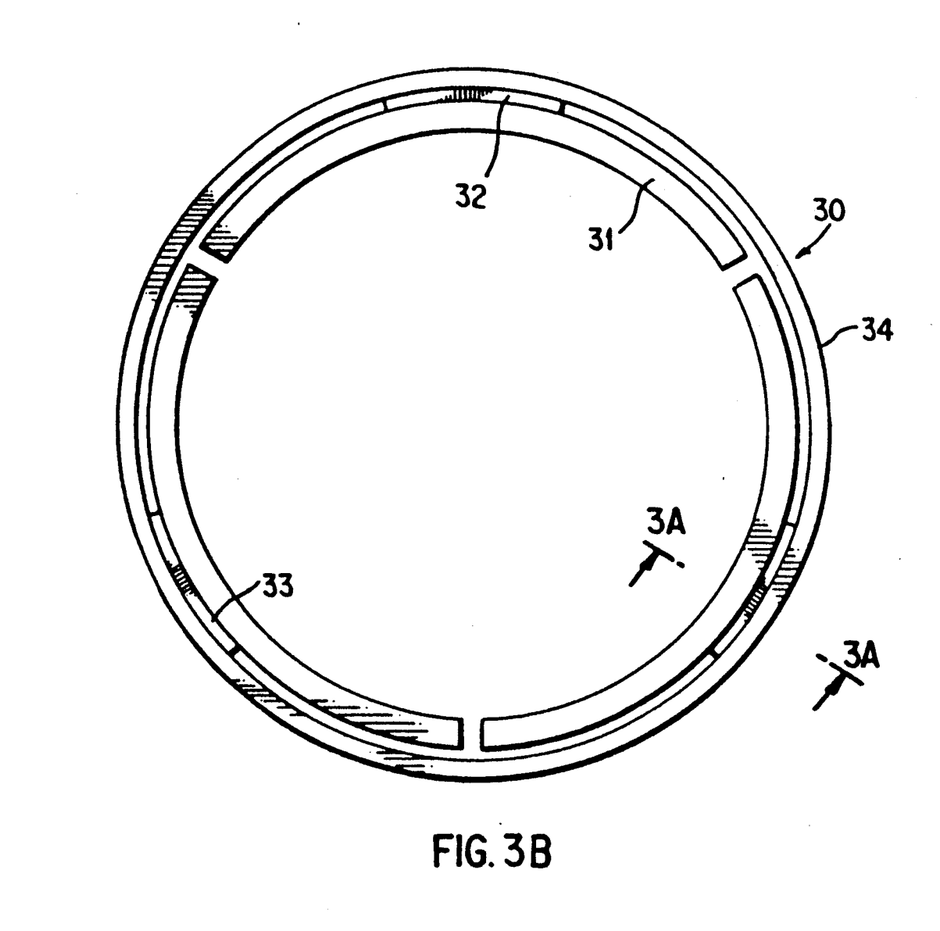

FIGS. 3A and 3B show a first self adjusting plain or gas-lubricated stationary shaft support according to the present invention. For purposes of clarity in these and other figures depicting shaft supports, openings in the support structure are darkened. Further, in FIG. 3A and 3B, it should be understood that the inner diameter of the shaft support encircles the shaft to be supported. The outer diameter of the shaft support is mounted to the stator. This is also true for the shaft support of FIGS. 4A-C described below.

The plain or gas-lubricated shaft support includes a shaft supporting pad 31 and a support structure 32, 33 and 34. The pad 31 has a surface which is part of a plain or gas-lubricated bearing construction, as described below. The support structure gives the plain or gas-lubricated bearing a self-adjusting spring characteristic unknown in prior plain or gas bearings and includes a stub-like beam as primary support portion 32 centrally located with respect to the shaft supporting pad 31, a thin membrane-like second support portion 33 and a third support portion defined by a pair of continuous support beams or legs 34. The support structure 32, 33, 34 is neutrally arranged with respect to the support pad 31 so as to inhibit any deflection of the support pad 31 other than pure radial deflection. In particular, the support pad 31 is relatively thick in the radial direction and has a very large circumferential dimension so as to inhibit radial, axial or circumferential deflection. Similarly, the primary support portion 32 and legs 34 are rigid (because of their radial and circumferential dimensions) and tend not to deflect. However, as can be seen particularly well in FIG. 3A, the circumferential membrane 33 which stretches between the legs 34 and supports the stub-like beam of the primary support portion 32 bearing pad 31 is quite thin in the radial direction, and thus flexible.

As mentioned above and shown in the drawings, the support structures shown in FIGS. 3A, 3B, 4A, 4B, and 46 are structurally neutral, i.e., they have no tendency to deflect in one direction more than another direction. Thus, when a force is applied against the support pad 31, it acts through the primary support portion 32 directly on the middle of the continuous membrane 33 such that the membrane 33 deflects directly radially, in a trampoline-like fashion. Of course, the actual deflection of the membrane is small, but it is enough to slidably support the rotating shaft. In this way, the bearing pad 31 has the ability to deflect like a spring radially inward and outward to optimally support the shaft portion of the rotor 10. Because of the neutral construction of the support structure there is no tendency for the support pad 31 to deflect in any direction. Thus, unlike the present inventors previous deflection pad bearings, there is no tendency for the pads to deflect to form a hydrodynamic wedge.

The surface of the pads and support surface they move relative to could be plane. In this case, one of the surfaces should be constructed of a porous material which is loaded with a lubricant such as oil or graphite.

Figure 10A:
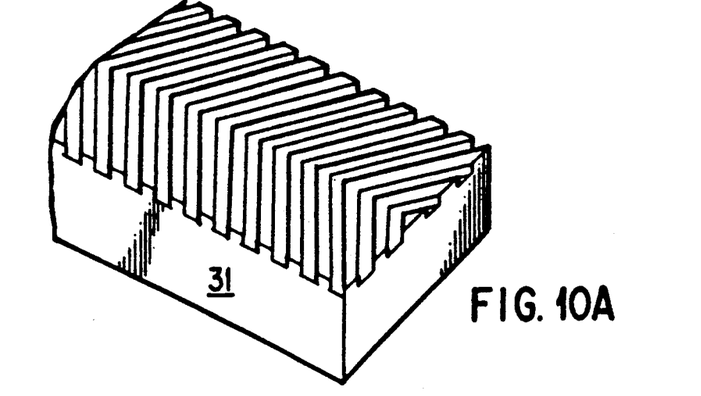
FIG. 10A is a partial perspective view showing a herringbone contour formed on a bearing pad.
Figure 10B:
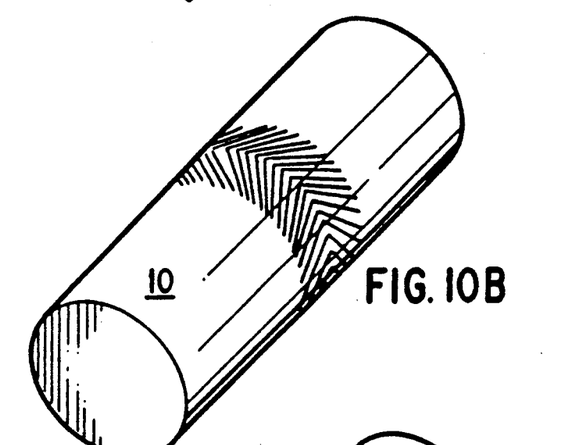
FIG. 10B is a partial perspective view showing a herringbone contour formed on a shaft.
Figure 10C:
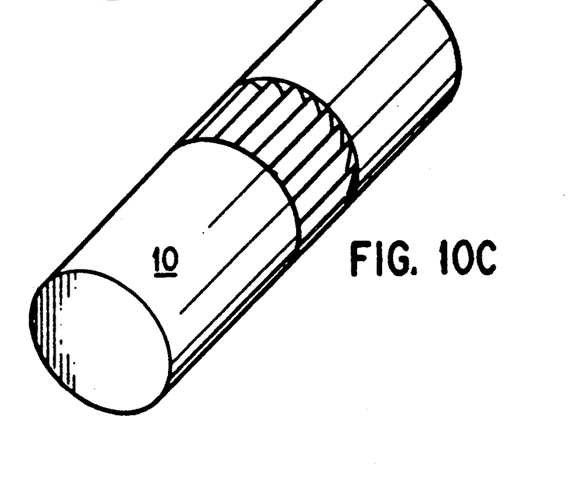
FIG. 10C is a partial perspective view showing a taper contour formed on a shaft.

However, in accordance with an important aspect of the present invention, either a hydrodynamic bearing the pads of which deflect to form a wedge or the above described radial spring-like deflecting pad construction is ideally suited for supporting a gas-lubricated bearing such that the gas-lubricated bearing is self-adjusting. In order to achieve the gas-lubricated bearing function, either the pad surface or the surface supported by the pad or both is/are etched to provide a contoured surface. FIG. 10A shows, somewhat schematically, a herringbone contour formed on a bearing pad 31. Likewise, FIG. 10B shows a herringbone contour formed on a shaft and FIG. 10C shows a tapered contour formed on a shaft. All of these illustrations are schematic and show the contours with greatly exaggerated dimensions. In reality the depth of the contours is likely to be in the range of 100-300 millionths of an inch. The contoured surface can have various shapes including taper, taper-flat, step, spiral groove and herringbone contour shapes. The purpose of the contoured surface is to pressurize air or other gas sucked in the grooves when the shaft rotates at high speeds. As the gas is pressurized, an air film develops between the rotating member and the stator this air film supports the rotating member on the stator.

Unlike other plain or gas-lubricated bearings, the bearing of the present invention does not have to be machined to precise tolerances so as to provide a specific gap between the contoured surface and the surface which it supports or is supported on. This is because the support pads are supported by a support structure which can be designed to deflect, either to form a wedge in the case of a gas-lubricated hydrodynamic bearing or radially outward or inward in the case of the neutral construction described above, in response to the generation of pressure within the contoured surface for gas-lubricated bearings or bias the pads into constant contact with the support surface in the case of plain bearings. Thus, according to the present invention, the support pads can be dimensioned so as to be in zero clearance contact with the member to be supported when the shaft is at rest. Typically, this is done by dimensioning the support pads to have an interference fit with the surface they support. For instance, if the support member is to be mounted on the stator to support shaft, the inner diameter of the support member is designed to be slightly smaller than the outer diameter of the shaft to be supported so that when the shaft is inserted into the support member, the pads are caused to deflect outwardly and are subsequently pressing on the shaft. Since the pad is mounted for deflection radially inward and outward toward the shaft and because it is initially fit with zero clearance over the shaft so as to pre-bias the pads toward the shaft, the pads will always have a tendency to move toward the shaft. This is ideal for a plain bearing. In a gas or air bearing, as the shaft begins to move, pressure is generated in the contoured surface, this pressure causes the pads to deflect radially outward precisely the necessary amount to obtain shaft support. Proper performance of the bearing is insured by designing the support structure so as to have a characteristic stiffness in the radial direction which is less than the characteristic stiffness of the pressurized gas when the shaft first begins to rotate and is equal to the characteristic stiffness of the pressurized gas at the time of optimal shaft support. When the support member is mounted on the rotating member for movement relative to a stationary support surface, it may be desirable to dimension the support member to have a clearance with respect to the support surface. In such a case, the support structure can be designed so that the pads move radially outward in response to centrifugal force to take up excess clearance.

As the rotor begins to rotate, gas (such as air) passes across the contoured surface and becomes progressively pressurized until it reaches a point where the gas pressure exceeds the characteristic stiffness of the support structure; in this case, the point where the gas pressure becomes sufficient to deflect the membrane of the secondary support portion. At this point, the pad begins to deflect radially outward away from the surface to be supported precisely such that a pressurized gas film develops between the pad and the surface to be supported. Eventually an equilibrium state is reached and the shaft is supported on a pressurized gas film and has no contact with the support surface. In practice, the fluid film is established almost instantaneously.

In the case of gas-lubricated support members or bearings used to support the rotor in the disk drive of the present invention, it is believed that a herringbone contour surface provides the best results. This is because the herringbone is relatively easy to form on either the shaft or pad surface and can result in generation of high viscosity air so as to provide good operating results. Examples of herringbone contours formed on a bearing pad 31 and shaft 10, respectively, are shown in FIGS. 10A and 10B. FIG. 10C shows a tapered contour formed on a shaft 10. The contour consists of grooves having a depth of about 100–300 millionths of an inch and a width of between 0.05 and 0.10 inches. These grooves can be formed using any known technique, however etching is the most commonly used technique. Another known technique is referred to as photocutting; in accordance with this technique a photo resistent film or template is placed on the shaft or support member and a special ray, such as a laser or the like is used to corrode the metal not protected by the templates or photo resistant film.

It is expected that a bearing constructed along these lines for use in the disk drives of the present invention should have a load supporting capacity of between 10 and 15 pounds per square inch. This is more than enough to handle the loads experienced by a disk drive bearing. Accordingly, the self-adjusting gas-lubricating bearing of the present invention is ideally suited for use in the low profile disk drive construction of the present invention.

Figure 4A:
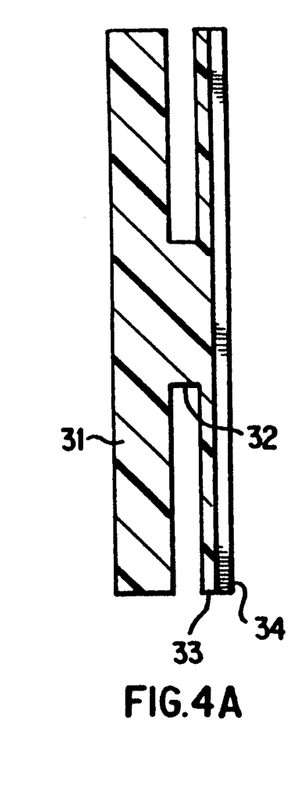
FIG. 4A is a partial cross section of another shaft support according to the present invention.
Figure 4B:
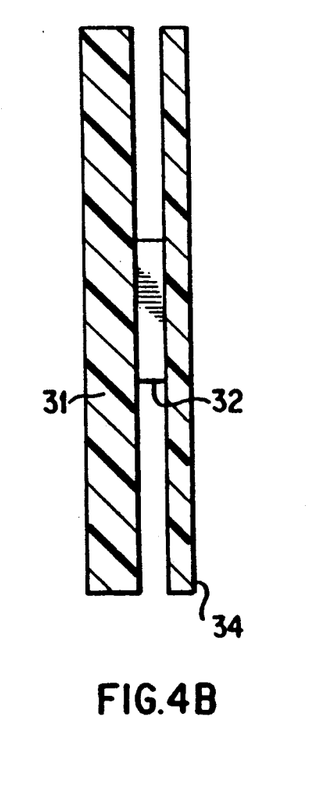
Figure 4C:
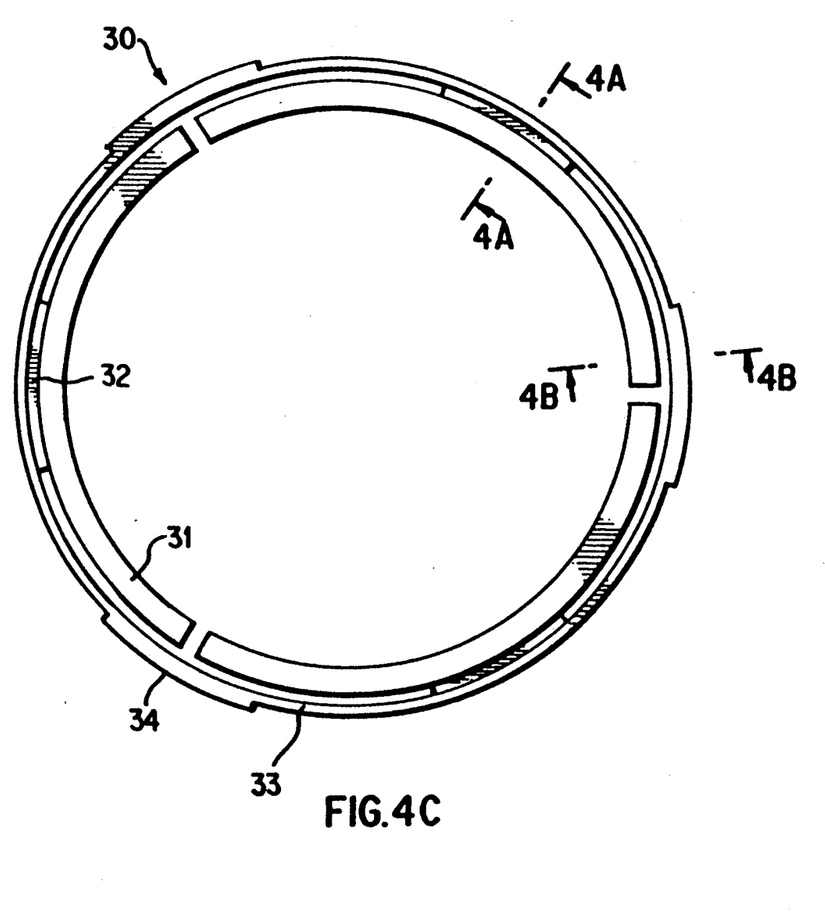
FIG. 4C is an axial view of the shaft support of FIGS. 4a and 4b.

Another stationary shaft support is shown in FIGS. 4A, 4B and 4C. This stationary shaft support structure is similar to that shown in FIGS. 3A and 3B except that the third support portion 34 is provided by spaced axial beams or legs rather than continuous cylindrical beams or legs. Despite this difference, the second support portion or membrane 33 still stretches between spaced legs 34 and the construction is still neutral such that pad 31 can move in and out but does not tend to deflect. Thus, the nature of the pad support is essentially the same as that of the embodiment of FIGS. 3A and 3B. Likewise, the plain or gas-lubricated bearing construction between the pad surface and the surface to be supported is the same as that described above. One advantage of the construction of FIGS. 4A-4C is that, if desired, it could be easily molded. This is because, as viewed in FIG. 4C, the support has no hidden cavities. Thus, the structure could be formed by a simple mold consisting of two mold halves.

Figure 5:
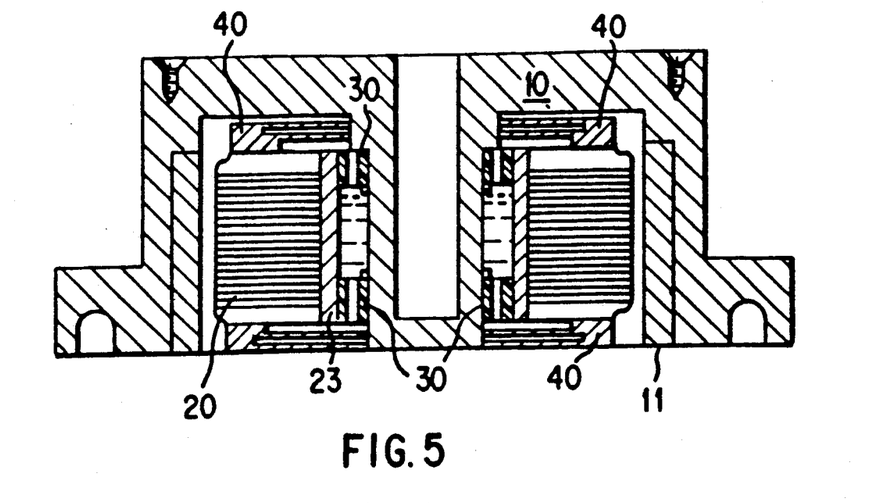
FIG. 5 is a somewhat schematic view of another disk drive according to the present invention.

FIG. 5 shows another disk drive according to the present invention. The disk drive construction of FIG. 5 is similar to that of FIG. 1 except that the disk drive includes shaft supports 130 which rotate with the shaft portion of the rotor instead of stationary shaft supports. Examples of suitable shaft supports are described in connection with FIGS. 7A, 7B, 8A, 8B and 8C. Alternatively, hydrodynamic deflecting pad bearings can be used. Regardless of the form of deflecting pad support member or bearing, the pads must be radially outward of the support structure.

Figure 6:
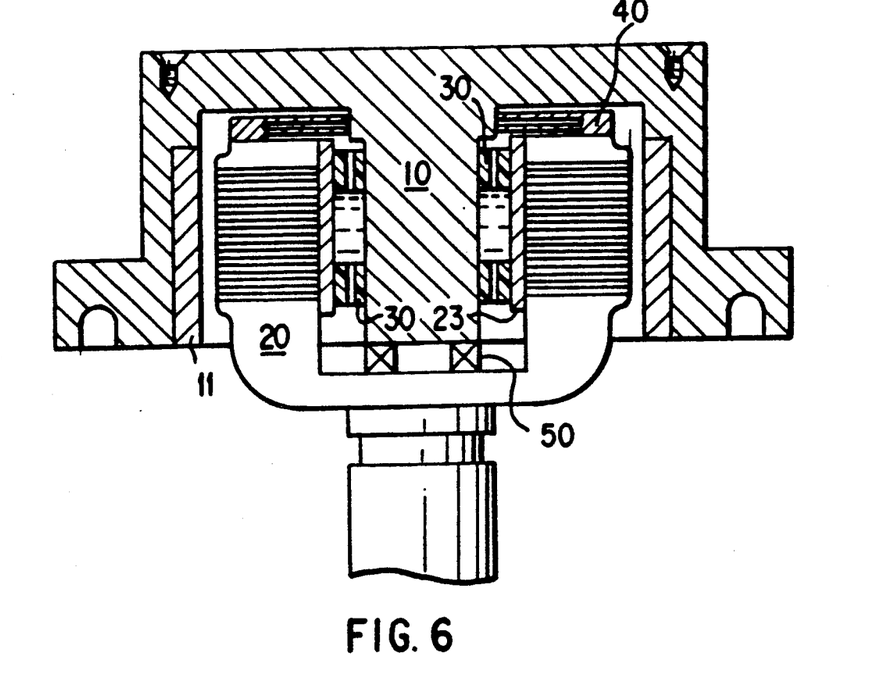
FIG. 6 is a somewhat schematic cross section of another disk drive according to the present invention.

FIG. 6 shows another interlocked disk drive construction according to the present invention. This disk drive construction is similar to that of FIG. 2 except that it includes shaft supports 130 which rotate with the rotor instead of stationary shaft supports 30 of the type used in the FIG. 2 construction. Again, the shaft supports shown in FIGS. 7A, 7B, 8A, 8B and 8C or hydrodynamic deflecting pad bearings can be used.

Figure 7A:
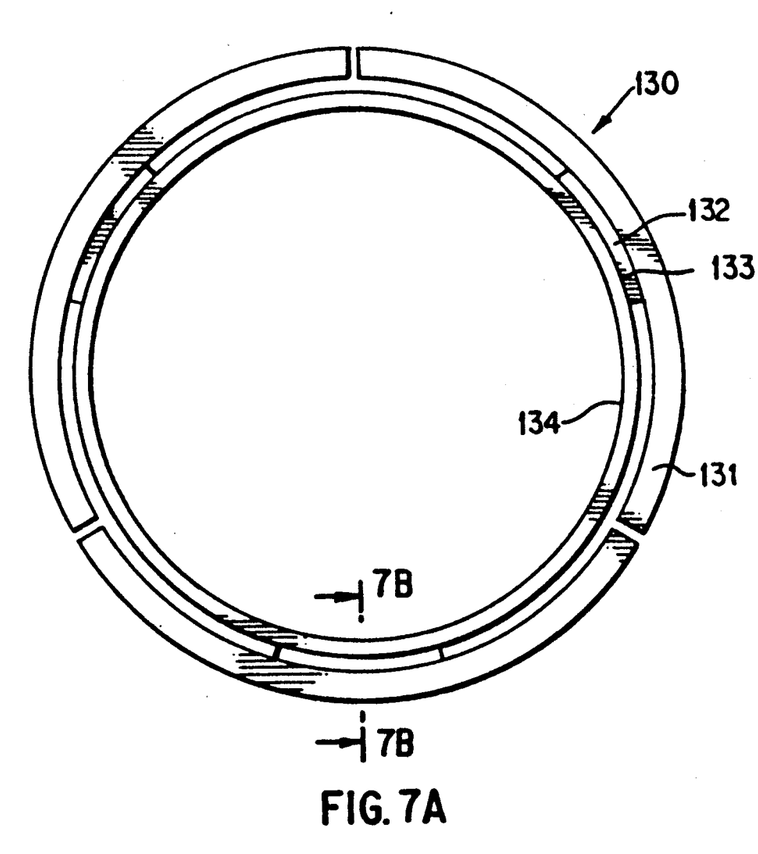
FIG. 7A is an axial view of a running shaft support according to the present invention.
Figure 7B:
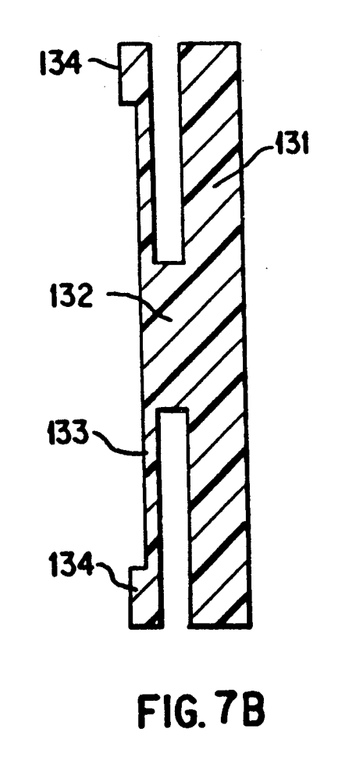

FIGS. 7A and 7B illustrate a first self-adjusting plain or gas-lubricated rotating shaft support for use in disk drives the type illustrated in FIGS. 5 and 6 and elsewhere. The shaft support of FIGS. 7A and 7B is intended to be attached to the central shaft portion of the rotor 10 of the disk drives shown in FIGS. 5 and 6. The disk drives are further provided with a smooth cylindrical sleeve 23 on the inner diameter of the stator 20. The sleeve 23 provides a smooth or contoured support surface for the rotating support pads (described below) to ride against. The support surface could be formed directly onto the stator, if desired.

The shaft support 130 includes an outer diameter which is substantially cylindrical. The outer diameter is made up of three circumferential running pad portions 131. The running pad portions 131 are relatively thick for two reasons. First the thickness inhibits deflection of the runner portion 131. Additionally, the thickness results in an increase in the mass of the runner portion 131 so that, as the shaft rotates, the centrifugal force tending to pull the portions 131 outward is increased. As noted above, because of the tendency of the pads 131 to deflect outward, these bearings can be dimensioned so as to have a clearance with the support shaft. In such a case, the balance between centrifugal force and gas pressure will result in a proper film thickness without the need for close tolerances.

The support structure 132-134 for supporting the running support pads 131 is analogus to the stationary support structure used to support the support pads 31 of the shaft supports of FIGS. 3 and 4. Of course, there are differences owing to the inverse orientation of the supports. The runner portions 131 are supported on a stub-like support beam or pedestal 132 which functions as a primary support portion. The support beam 132 is very rigid (because of its radial and circumferential dimensions) so that it will not deflect. The primary support beam 132 and the running pads 131 are supported on a continuous membrane 133 which functions as a secondary support portion. The membrane 133 is very thin in the radial direction (and thus flexible in this direction) and stretches between support beams or legs 134 which functions as a tertiary support portion. The support legs 134 are rigid such that the thin membrane 133 is supported in a trampoline-like fashion. In the embodiment shown in FIGS. 7A and 7B, the support beams or legs 134 are continuous cylindrical members.

The construction of the shaft support of FIGS. 7A and 7B is neutral (i.e., balanced) so that the only deflection that occurs is inward and outward radial deflection of the membrane 133. As a result of this deflection, the running pad 131 can move radially inward and outward as required to establish support against the smooth or contoured stator surface 23. Thus, when the rotor 10 rotates, the running shaft support 130 which is attached to the rotor rotates as well. As a result of the rotation of the member 130, centrifugal force acts on the running pad 131 tending to force the running pad outward toward the smooth surface of the stator. If the support member or bearing is designed to have an interference fit with the stator, the gas pressure generated must be sufficient to overcome both centrifugal force and the spring force of the support structure. If the support member or bearing has a clearance with respect to the support surface, only centrifugal force must be overcome. In either case, the generation of gas pressure tends to cause separation of the pad surface and support surface, i.e., causes the pad surface to move away from the support surface.

A gas-lubricated bearing construction can be formed between the running pad 131 and the surface on which it runs. Specifically, one or both of the running pad and the surface on which it runs can be formed with a contour. The shape and function of the contour is the same as described above and shown, for example, in FIGS. 10A, 10B and 10C. The pads 131 can be designed, i.e., dimensioned, to contact the surface on which they run when the shaft is at rest or to have a clearance. For instance, the pads can be designed to have an interference fit with the stator surface. When the shaft, and consequently the pads, begins to move the air passing through the grooves is pressurized to the extent necessary to cause inward deflection of the pads and to support the pads (and shaft) on an air film in the same manner described above for the stationary shaft supports of FIGS. 3A, 3B, 4A, 4B and 4C.

Alternatively, the pads and/or support surface can have a lubricant loaded plain surface as discussed above. Again, prebiasing the pads into contact with the support surface can be advantageous in such a construction.

Figures 8A, 8B:
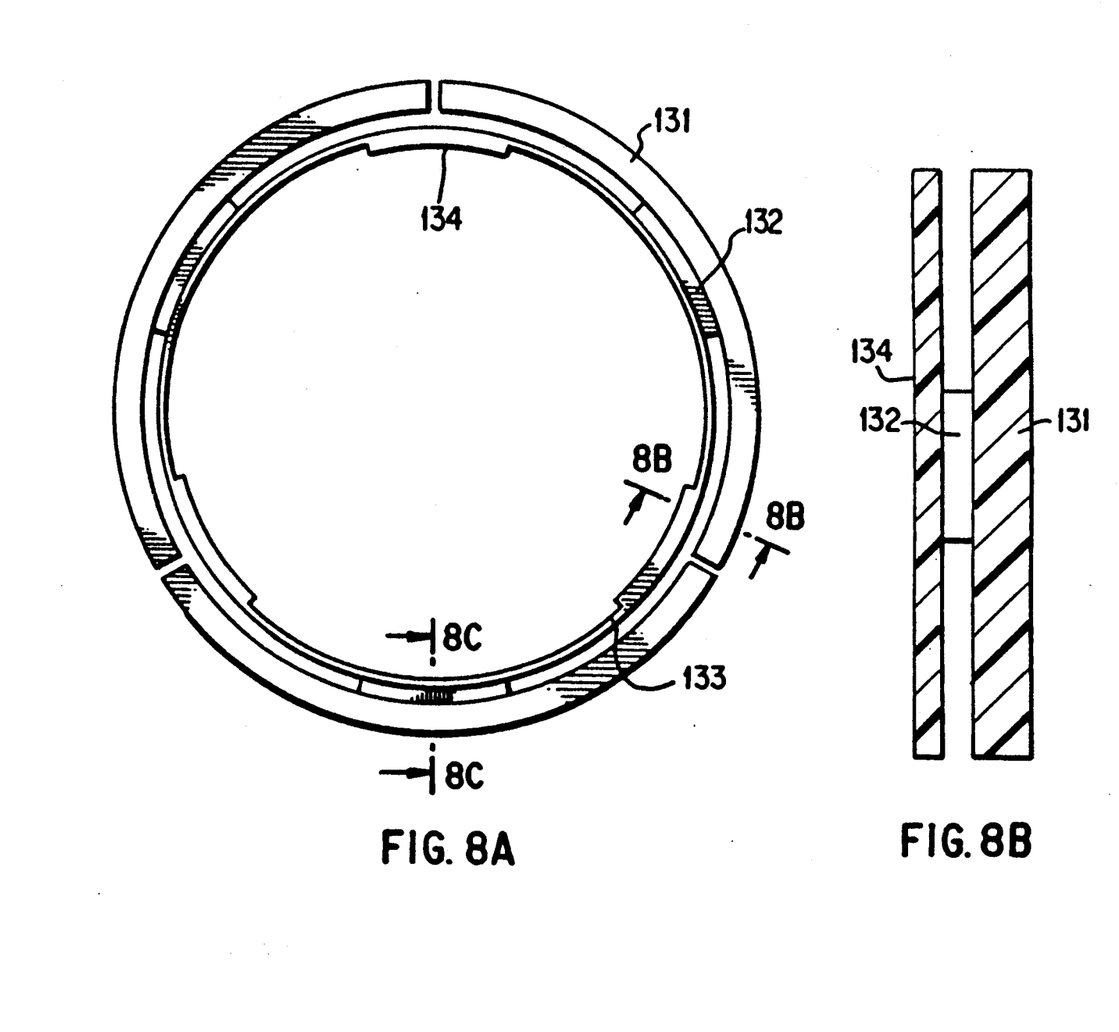
FIG. 8A is a axial view of another running shaft support according to the present invention.
FIG. 8B is a partial cross section of the running shaft support of FIG. 8A.
Figure 8C:
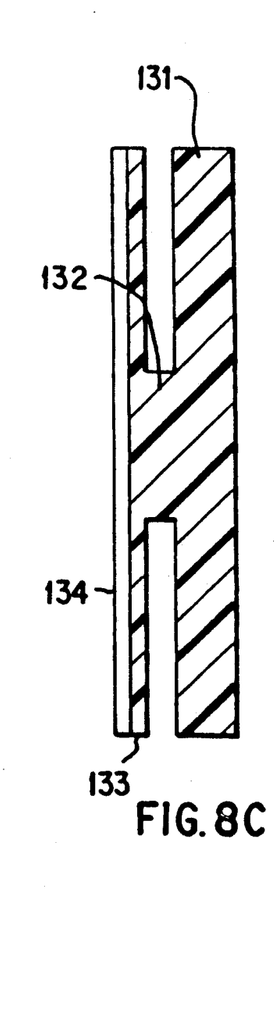
FIG. 8C is a different partial cross section of the running shaft support of FIG. 8A.

The running shaft support structure shown in FIGS. 8A, 8B and 8C is similar to that shown in connection with FIGS. 7A and 7B and described above. The difference between the two constructions resides mainly in the construction of the support beams or legs 134. Specifically, in the construction of FIGS. 8A and 8B, axially extending beams or leg portions 134 are used rather than the continuous circumferential legs of FIGS. 7A and 7B. Notwithstanding this difference, the operation of the running shaft support is essentially the same. Specifically, the running pads 131 and the primary runner support portion 132 and the axial beams or legs 134 are rigid and the thin membrane 133 extending between the leg portions 134 tends to deflect radially inward and outward. Consequently, as a result of the centrifugal force resulting from rotation of the runner pad 131 upon the runner pad 131 tends to deflect outwardly. Ordinarily, the running pads 131 would be designed so as to be in contact with, i.e., have an interference fit with, the smooth or contoured running surface 23 of the stator 20 when the rotor is at rest.

For a gas-lubricated support member, either the runner pad surface or the surface against which it runs (the support surface) or both has a contour formed thereon such that a gas bearing effect is achieved, as described above, between these two surfaces. Further, because of the flexible support of the running pads there is no need to machine the gas bearing elements to the close tolerances previously required. Upon rotation, outward motion of the runner pad 131 will automatically adjust itself to establish a fluid film between the running surface and the runner pad 131 in the manner described above.

Figure 9A:
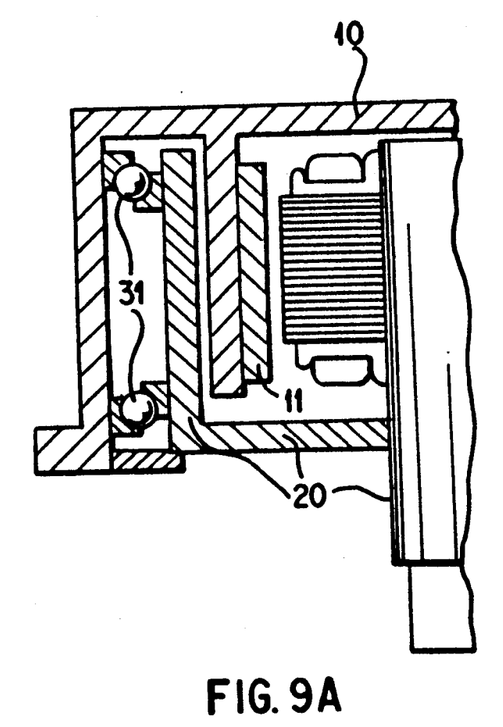
FIG. 9A shows a somewhat schematic partial cross section of another disk drive.
Figure 9B:
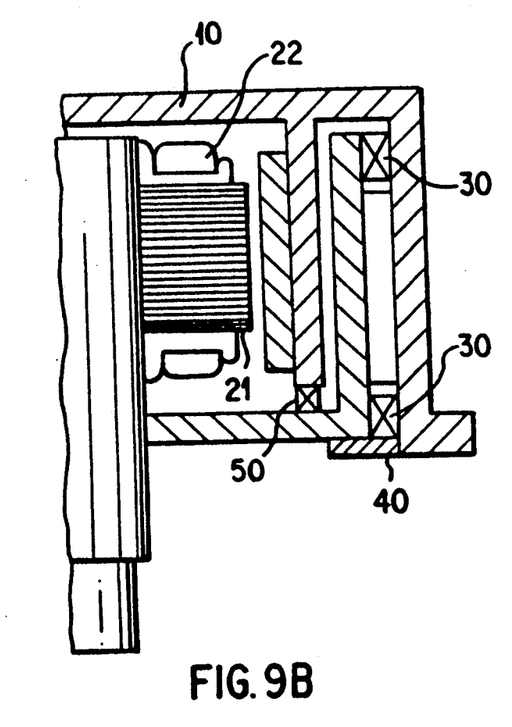
FIG. 9B shows a somewhat schematic partial cross section of yet another disk drive.

FIGS. 9A and 9B show another interlocked disk drive motor arrangement according to the present invention. Like the previously described disk drives, this disk drive includes a rotor 10, a stator 20 having a motor coil and a seal structure 40 such as ferrofluidic seals or the like for providing a seal between the rotor and stator. However, in this embodiment the stator and rotor having interlocking casings and the support elements (rolling element bearings, deflecting pad bearings, gas-lubricated bearing and the like) are mounted at the outer periphery of the motor construction.

The rotor 10 has a cup-shaped outer housing, but does not include a central shaft portion. Instead, the rotor includes an inner cup portion 10A on which the permanent magnetic segments or single magnetic element 11 is mounted. The inner cup portion 10A surrounds the stator windings and laminations and is spaced from the outer periphery of the rotor 10 so as to define a ring-shaped space.

In accordance with this embodiment, the stator 20 also has a cup-like casing portion which includes cylindrical walls 27. The cylindrical walls 27 are dimensioned so as to fit within the ring-shaped space between the outer periphery of the rotor 10 and the inner cup-like member 10A as shown in FIGS. 9A and 9B. By virtue of this construction, the rotor 10 can be mounted for rotation on the stator 20 by a combined radial-thrust angled rolling element bearing arrangement 31 (preferably spring loaded) as shown in FIG. 9A or by deflecting pad support members (such as a hydrodynamic bearing, a plain bearing, or gas-lubricated members) as illustrated schematically at 30 in FIG. 9B. In the construction of FIG. 9B a thrust bearing 50 of the type described above is also provided. The thrust bearing 50 is preferably located with the sealed casing as shown.

This construction provides an extremely low profile housing and allows support of the rotor closer to the outer periphery of the motor constructions so as to provide a more stable support. Also, a larger rolling element bearing can be used (in other arrangements the size of rolling elements which can be used is limited by the shaft diameter) so that some of the disadvantages resulting from small rolling element bearings are eliminated. Additionally, because of the dual cup interlocked construction only one seal is required. Further, although not illustrated, the construction of FIGS. 9A and 9B makes it possible to eliminate the shaft member entirely. If this is done, some type of cantilever or other support for the stator windings must be provided.

Although the construction of FIGS. 9A and 9B can use either an angled radial-thrust rolling element bearing arrangement 31 (preferably spring loaded) or deflecting pad bearings 30, it is believed that deflecting pad bearings or supports offer better results including longer life, less noise, better shaft alignment and positioning, better stability and damping, lower cost, and an ability to work within a smaller radial envelope. Either hydrodynamic deflection pad bearings, plain bearings or gas-lubricated deflecting pad supports of the type disclosed above (either the stationary pad or running pad type) can be used. Nevertheless, it is an advantage of this construction that because of the radially outward location of the bearings, larger, better performing, ball bearings such as the illustrated angled ball bearing arrangement can be used.

I claim:

1. A unitary deflecting pad support member for supporting a rotating member for rotation with respect to a stationary member, the deflecting pad support member being mounted to one of the stationary member and the rotating member for supporting the other member, the other member having a support surface, the deflecting pad support member comprising:
    a plurality of circumferentially spaced pads and a support structure formed integrally with the pads for supporting the pads and maintaining the position of the pads relative to one another, each pad having a pad surface adapted to contact the support surface or the member which rotates relative to it, the support structure comprising:
    a substantially rigid primary support portion integrally formed as a single piece with the pads and supporting the pads, a secondary support portion supporting the primary support portion, the secondary support portion being flexible only in the radial direction and a substantially rigid tertiary support portion supporting the secondary support portion for movement in the radial direction, the support structure being arranged so as to bias the pads directly toward the surface it contacts, and a contour formed on at least one of the pad surfaces and the support surface, the contour being shaped such that, upon rotation of the rotating member, air located between the pads and the surface is pressurized such that the pads are pushed, against the bias of the support structure, away from the support surface and are separated by a film of pressurized fluid.

2. The deflecting pad support member of claim 1, wherein the primary support portion comprises a substantially rigid beam, the second support portion comprises a radially flexible membrane and the tertiary support portion comprises at least two substantially rigid beams.

3. The deflecting pad support member of claim 1, wherein the contour has a herringbone shape.

4. The deflecting pad support member of claim 1, wherein the contour has a spiral groove shape.

5. The deflecting pad support member of claim 1, wherein the contour has a stepped shape.

6. The deflecting pad support member of claim 1, wherein the deflecting pad support member has an easily moldable shape.

7. The deflecting pad support member of claim 1, wherein the pads are located radially outward of the support structure.

8. The deflecting pad support member of claim 1, wherein the support member is mounted to the rotating member for rotation with the rotating member relative to the stationary member and wherein the pads of the support member are located radially outward of the support structure.

9. The deflecting pad support member of claim 1, wherein the contour is formed on the shaft and the pad surfaces are smooth.

10. A bearing for supporting a rotating member with respect to a stationary member, the bearing being mounted to one of the stationary member and the rotating member for supporting the other member, the other member having a support surface, the bearing comprising a plurality of spring loaded bearing pads, each pad having a smooth pad surface and a spring like support structure for supporting the bearing pads, the support structure comprising:
    a plurality of rigid stub beams, each stub beam supporting a bearing pad; at least one membrane supporting the rigid stub beams, the membrane being spaced from the bearing pads by the stub beams and flexible toward and away from the bearing pads; and a plurality of rigid membrane support beams supporting the membrane for deflection toward and away from the bearing pads; the support structure being arranged such that each pad is supported by a stub beam which is supported on a portion of a flexible membrane which extends between two spaced membrane support beams such that the bearing pads are spring loaded and wherein at least one of the pad surface and support surface being formed of a porous material loaded with lubricant.

11. The bearing of claim 10, wherein the pads are located radially outward of the support structure.

12. The bearing of claim 10, wherein each pad includes opposed side edges, a leading edge and a trailing edge and a geometric center at a point equidistant from the leading edge and the trailing edge, and wherein each stub beam is connected to the pad at a location proximate the geometric center of the pad and spaced from the opposed side edges such that pad is supported for tilting to accommodate misalignment.

13. The bearing of claim 10, wherein the entire bearing is formed as a single integrally formed piece such that in the unloaded state the position of the pads relative to another and the support structure is fixed and unalterable.

14. The bearing of claim 10, wherein the bearing is mounted to the rotating member for rotation with the rotating member relative to the stationary member and wherein the pads of the bearing are located radially outward of the support structure.

15. A deflecting pad support member for supporting a rotating member with respect to a stationary member, the deflecting pad support member being mounted to one of the stationary member and the rotating member for rotation relative to the other member, the other member having a support surface, the deflecting pad support member comprising:

a plurality of substantially rigid pads and a support structure for supporting the pads, each pad having opposed side edges, a leading edge, a trailing edge and a pad surface extending between the leading edge and the trailing edge and between the opposed side edges, the pad surface being adapted to contact the support surface of the member which rotates relative to it, the support structure comprising:

a substantially rigid primary support portion supporting the pads at a location which is spaced from the opposed side edges of the pad so that the pad can move to accommodate misalignment, a second support portion supporting the primary support portion, the second support portion being flexible in the radial direction and a substantially rigid tertiary support portion supporting the secondary support portion for movement in the radial direction, the support structure being arranged so as to bias the pads directly toward the surface it contacts, and a contour formed on at least one of the pad surfaces and the support surface, the contour being shaped such that, upon rotation of the rotating member, air located between the pads and the surface is pressurized such that the pads are biased against the bias of the support structure, away from the support surface and are separated by a film of pressurized fluid.

16. The deflecting pad support member of claim 15, wherein the contour has a herringbone shape.

17. The deflecting pad support member of claim 15, wherein the contour has a spiral groove shape.

18. The deflecting pad support member of claim 15, wherein the contour has a stepped shape.

19. The deflecting pad support member of claim 15, wherein the deflecting pad support member has an easily moldable shape.

20. The deflecting pad support member of claim 15, wherein the support member is mounted to the rotating member for rotation with the rotating member relative to the stationary member and wherein the pads of the support member are located radially outward of the support structure.

21. The deflecting pad support member of claim 15, wherein the contour is formed on the shaft and the pad surfaces are smooth.

* * * * *